US011732211B2

(12) United States Patent
Pastorello et al.

(10) Patent No.: US 11,732,211 B2
(45) Date of Patent: Aug. 22, 2023

(54) PIPE SEALING COMPOUND/ADJUNCT LUBRICANT

(71) Applicant: RTX SCIENTIFIC, INCORPORATED, Anaheim, CA (US)

(72) Inventors: John Pastorello, Fullerton, CA (US); Michael Pastorello, Yorba Linda, CA (US)

( * ) Notice: Subject to any disclaimer, the term of this patent is extended or adjusted under 35 U.S.C. 154(b) by 0 days.

(21) Appl. No.: 17/539,060

(22) Filed: Nov. 30, 2021

(65) Prior Publication Data

US 2023/0167379 A1    Jun. 1, 2023

(51) Int. Cl.
| | |
|---|---|
| *C10M 169/04* | (2006.01) |
| *C10M 107/50* | (2006.01) |
| *C10M 147/00* | (2006.01) |
| *C10M 125/26* | (2006.01) |
| *C10M 125/10* | (2006.01) |
| *C10M 161/00* | (2006.01) |
| *F16L 15/04* | (2006.01) |
| *C10N 30/02* | (2006.01) |
| *C10N 40/34* | (2006.01) |
| *C10N 50/08* | (2006.01) |

(52) U.S. Cl.
CPC ...... *C10M 169/044* (2013.01); *C10M 107/50* (2013.01); *C10M 125/10* (2013.01); *C10M 125/26* (2013.01); *C10M 147/00* (2013.01); *C10M 161/00* (2013.01); *F16L 15/04* (2013.01); *C10M 2201/062* (2013.01); *C10M 2201/105* (2013.01); *C10M 2213/062* (2013.01); *C10M 2229/025* (2013.01); *C10N 2030/02* (2013.01); *C10N 2040/34* (2013.01); *C10N 2050/08* (2013.01)

(58) Field of Classification Search
CPC ............ C10M 2229/04; C10M 105/76; C10M 113/10; C10M 113/12; C10M 125/26; C10M 2201/10; C10M 2201/102; C10M 2201/105; C10M 2209/02; C10M 2213/062; C10M 113/02; C10M 125/02; C10M 2201/041; C10M 2201/066; C10M 2201/08; C10M 2219/042; C10N 2010/04; C10N 2010/08; C10N 2040/20; C10N 2040/241; C10N 2010/14; C10N 2010/12
See application file for complete search history.

(56) References Cited

U.S. PATENT DOCUMENTS

| | | |
|---|---|---|
| 2,177,100 A | 10/1939 | Frame |
| 3,047,316 A | 7/1962 | Wehring et al. |
| 3,526,593 A | 9/1970 | Oliver |
| 6,034,002 A | 3/2000 | Maderek |
| 6,869,111 B2 | 3/2005 | Goto |
| 7,360,798 B2 | 4/2008 | Matsumoto |
| 9,568,126 B2 | 2/2017 | Sasaki et al. |
| 9,752,710 B2 | 9/2017 | Goto |
| 10,336,962 B2 | 7/2019 | Goto |
| 10,480,259 B2 | 11/2019 | Goto |
| 10,889,739 B2 | 1/2021 | Prell et al. |
| 11,066,587 B2 | 7/2021 | Prell et al. |
| 2002/0190481 A1 | 12/2002 | Casey et al. |
| 2006/0276349 A1 | 12/2006 | Scholer et al. |
| 2009/0264326 A1 | 10/2009 | Imai et al. |
| 2019/0241781 A1 | 8/2019 | Ledwith et al. |
| 2021/0087488 A1* | 3/2021 | Schlarb ............... C10M 107/00 |

* cited by examiner

Primary Examiner — Vishal V Vasisth

(57) ABSTRACT

The present invention describes a pipe sealing compound/adjunct lubricant used to prevent gas or liquid leaks when applied to pipe threads and other connections of the same. The compound relies on silicone oil lubricant(s) and one or more friction modifier(s), viscosity builder(s) and filler material(s). The compound contains a viscoelastic liquid that does not have a curing phase and is resistant to hardening and/or drying. The compound is chemically resistant to a wide variety of liquids and gases, is food safe and can withstand extreme high or low temperatures and precipitous temperature fluctuations. The compound has been found to exhibit an inverse pressure to leak rate phenomena.

18 Claims, No Drawings

PIPE SEALING COMPOUND/ADJUNCT LUBRICANT

BACKGROUND OF THE INVENTION

FIELD OF THE INVENTION

The present invention relates generally to pipe joint compounds, and specifically to joint compounds having no curing phase, which compounds are lubricating sealants that allow for easy assembly and disassembly of threaded connections, including those compounds formulated with food safe materials for uses in drinking water systems or with other consumable liquids or gases, as well as methods of use of such compounds and kits containing said compounds.

BACKGROUND INFORMATION

All piping connections threaded, bonded or even soldered exhibit gas or liquid leakage to some degree. This is because flaws and defects in the assembly can be at a microscopic or atomic level, and hence, visually undetectable. Typically, the leak rate as measured on an atomic scale could be as small as [$10^{-15}$ cc/sec] or microscopically as large as [$10^{-2}$ cc/sec].

In plumbing, heating, automotive and countless other industries, critical leakage of gas or liquids must be prevented or maintained at extremely low rates preferably at an atomic level.

The best method for testing leakage is with helium gas leak detection instrumentation and its ancillary testing procedures. The final formulations for this invention as disclosed herein were guided and optimized using helium leak detection data.

The use of sealing articles, methods and compounds have been the theme of many patented inventions. Teflon tape, polytetrafluoroethylene (PTFE) is often used by mechanics. The threaded part of the male pipe fitting is wrapped several times with the tape. Often the tape will shred upon assembly, enter the system and cause blockage or a restriction. Another more prominent disadvantage of using tape is the extra stress and strain put on the fully tightened assembly which can lead to stress cracking.

Filament or yard coated pipe wrapping material is subject to the same disadvantages as tape as explained above.

Pipe compounds containing fibers, microfibers or strands may not be as stressful on the assembly as the tapes or yarns but excess compound will be pushed out of the assembly with tightening to cause plugging or restrictions in small passage ways or orifices. These filaments may also wash out of the assembly overtime and plug or restrict as above.

U.S. Pat. No. 10,889,739 relies on a filament or yarn coated with a paste made from natural oil or silicone oil (herein incorporated by reference in its entirety).

U.S. Pat. No. 7,168,707 is much the same as the above cited patent using a filament coated with a paste (herein incorporated by reference in its entirety).

U.S. Pat. No. 4,548,960 relies on plastic fibers entrained in the paste (herein incorporated by reference in its entirety).

The present invention as disclosed herein is not a paste, gel, thixotrope, flexible tape or film as with prior art. The present invention as disclosed herein does not rely upon the use of fibrous materials, threads, granules or flakes. The present invention as disclosed herein does not contain solid materials having diameters that would obstruct flow.

The physical state of the present invention is that of a viscoelastic liquid. That is a liquid that can be stretched or elongated several inches or as much as several feet before the tension breaks. One example of a viscoelastic liquid would be honey. On the other hand, a paste is a semi solid liquid such as toothpaste which does not elongate and will break tension almost immediately. Mayonnaise, a gel, will not extend. Ketchup, a thixotropic, is a semi pourable mass of solid material that also does not extend. Thus, there is a genuine rheological dissimilarity with the present compound as to its physical structure and behavior under stress.

SUMMARY OF THE INVENTION

The present invention is based on a viscoelastic liquid, primarily silicone oil, namely, polydimethylsiloxane or chemically similar silicone lubricants.

In embodiments, a viscoelastic liquid sealing composition is disclosed containing silicone oil and a building block, where the building block includes a friction modifier, a viscosity booster, a filler and/or bulking agent, and combinations thereof, and where the composition exhibits a viscosity in the range of about $2 \times 10^4$ cSt to about $5 \times 10^5$ cSt.

In one aspect, the composition is non-curing. In another aspect, the silicone oil is present in the range of about 78% to about 90% wt/wt of the composition.

In one aspect, the friction modifier includes a fine to ultra-fine polytetrafluoroethylene (PTFE), graphite, molybdenum disulfide and combinations thereof. In a related aspect, the PTFE is present in the range of about 2% to about 20% PTFE wt/wt of the composition.

In one aspect, the viscosity booster includes fumed silica, organoclays and combinations thereof. In a related aspect, the viscosity booster is present in the range of about 0.5% to about 10% wt/wt of the composition.

In one aspect, the filler and/or bulking agent includes fine to ultra-fine inorganic powders of calcium carbonate, calcium sulfate, titanium dioxide; fine to ultra-fine powdered organic plastics of polyvinyl chloride (PVC), polyethylene, polypropylene and combinations thereof. In a related aspect, the filler and/or bulking agent is present in the range of less than about 40% wt/wt of the composition.

In one aspect, the silicone oil containing composition is non-curing and contains a friction modifier including a fine to ultra-fine polytetrafluoroethylene (PTFE), graphite, molybdenum disulfide and combinations thereof; a viscosity booster including fumed silica, organoclays and combinations thereof; and a filler and/or bulking agent including fine to ultra-fine inorganic powders of calcium carbonate, calcium sulfate, titanium dioxide; fine to ultra-fine powdered organic plastics of polyvinyl chloride (PVC), polyethylene, polypropylene and combinations thereof.

In embodiments, a viscoelastic liquid non-cure sealing composition is disclosed containing silicone oil, fine to ultra-fine polytetrafluoroethylene (PTFE), fumed silica, and a filler and/or bulking agent including fine to ultra-fine inorganic powders of calcium carbonate, calcium sulfate, titanium dioxide; fine to ultra-fine powdered organic plastics of polyvinyl chloride (PVC), polyethylene, polypropylene and combinations thereof.

In a related aspect, the composition exhibits a viscosity in the range of about $6.4 \times 10^4$ cSt to about $8 \times 10^4$ cSt.

In a further related aspect, the silicone oil is present in the range of about 50% to about 90% wt/wt of the composition. In another related aspect, the PTFE is present in the range of about 1% to about 50% wt/wt of the composition. In a further related aspect, the fumed silica is present in the range of about 1% to about 8% wt/wt of the composition, and where filler and/or bulking agent is present in the range of between about 30% and 40% wt/wt of the composition.

In embodiments, a method of sealing threaded piping and/or plumbing fitting is disclosed including applying a viscoelastic liquid sealing composition to male and/or female threads contained in the piping or plumbing fitting; and connecting the composition applied threaded piping and/or plumbing fitting to a separate threaded piping and/or plumbing fitting, where the composition exhibits an inverse pressure to leak rate phenomena.

In one aspect, the viscoelastic liquid sealing composition comprises silicone oil and a building block, wherein the building block is selected from the group consisting of a friction modifier, a viscosity booster, a filler and/or bulking agent, and combinations thereof, and where the composition exhibits a viscosity in the range of about $2 \times 10^4$ cSt to about $5 \times 10^5$ cSt.

In a related aspect, the viscoelastic liquid sealing composition is non-curing.

In a further related aspect, the silicone oil containing composition contains a friction modifier including a fine to ultra-fine polytetrafluoroethylene (PTFE), graphite, molybdenum disulfide and combinations thereof; a viscosity booster including fumed silica, organoclays and combinations thereof; and a filler and/or bulking agent including fine to ultra-fine inorganic powders of calcium carbonate, calcium sulfate, titanium dioxide; fine to ultra-fine powdered organic plastics of polyvinyl chloride (PVC), polyethylene, polypropylene and combinations thereof, where the threaded piping and or plumbing fitting includes adaptors, elbows, couplings, unions, nipples, reducers, double-tapped bushings, tees, double-tees, crosses, caps, plugs, barbs, valves, compression fittings, flair fittings, flange fittings and combinations thereof.

In embodiments, a kit is disclosed including a viscoelastic liquid sealing composition comprising silicone oil and a building block, where the building block includes a friction modifier, a viscosity booster, a filler and/or bulking agent, and combinations thereof, and where the composition exhibits a viscosity in the range of about $2 \times 10^4$ cSt to about $5 \times 10^5$ cSt; instructions on how to apply the composition to threaded piping and/or plumbing fitting; a label; and a container comprising the kit components.

DETAILED DESCRIPTION OF THE INVENTION

Before the present compositions, methods, and methodologies are described, it is to be understood that this invention is not limited to particular compositions, methods, and experimental conditions described, as such compositions, methods, and conditions may vary. It is also to be understood that the terminology used herein is for purposes of describing particular embodiments only, and is not intended to be limiting, since the scope of the present invention will be limited only in the appended claims.

As used in this specification and the appended claims, the singular forms "a," "an," and "the" include plural references unless the context clearly dictates otherwise. Thus, for example, references to "a pipe fitting" includes one or more pipe fittings, and/or compositions of the type described herein which will become apparent to those persons skilled in the art upon reading this disclosure and so forth.

Unless defined otherwise, all technical and scientific terms used herein have the same meaning as commonly understood by one of ordinary skill in the art to which this invention belongs. Any methods and materials similar or equivalent to those described herein can be used in the practice or testing of the invention, as it will be understood that modifications and variations are encompassed within the spirit and scope of the instant disclosure.

As used herein, "about," "approximately," "substantially" and "significantly" will be understood by a person of ordinary skill in the art and will vary in some extent depending on the context in which they are used. If there are uses of the term which are not clear to persons of ordinary skill in the art given the context in which it is used, "about" and "approximately" will mean plus or minus <10% of a particular term and "substantially" and "significantly" will mean plus or minus >10% of the particular term. In embodiments, composition may "contain," "comprise" or "consist essentially of" a particular component or group of components, where the skilled artisan would understand the latter to mean the scope of the claim is limited to the specified materials or steps "and those that do not materially affect the basic and novel characteristic(s)" of the claimed invention.

As used herein, "silicone oil" means any liquid polymerized siloxane with organic side chains.

As used herein, "builder," including grammatical variations thereof, means a substance added to a material as a filler.

As used herein, "filler" or "bulking agent" means particles added to binders (plastics, composites, concrete) that can improve specific properties.

As used herein, "viscosity booster" means a substance added to a material, where that material now exhibits an increase in magnitude of internal friction due to the presence of the added substance.

As used herein, "friction modifier" means a substance added to a material in order to reduce the resistance that one surface or object encounters when moving over another.

As used herein, "non-curing" means a sealant that does not need to be set up to reach optimum viscosity or modulus at a certain temperature, where set up includes, for example, hardening by means of a chemical reaction.

As used herein, "sealing" means the application of a coating to a surface to make it substantially impervious to fluids (e.g., liquids and/or gases).

As used herein, "thixotrope" means a substance, such as a fluid or gel, which has a viscosity that decreases when a stress is applied.

As used herein, "viscoelastic" means a substance exhibiting both elastic and viscous behavior when deformed.

As used herein, "liquid" means a substance that flows freely but is of constant volume.

This invention as disclosed herein is based on a viscoelastic liquid, primarily silicone oil, including but not limited to, polydimethylsiloxane or chemically similar silicone lubricants, as would be apparent to the skilled artisan. Silicone polymers may be obtained in viscosities as low as 50 cSt to as high as 2,000,000 cSt. Although other oils may be used, silicone oils have a decided advantage. Silicone oils have extremely low volatility and high flash point. Silicone oils are chemically resistant and withstand temperatures from −50° F. to 500° F. Most silicone oils are considered food safe, are non-reactive and compatible with many different materials.

The present invention as disclosed herein, may have a viscosity range of 20000 cSt to 500,000 cSt. The silicone oil may be fortified with builder(s) that help to form a barricade to reduce gas and/or liquid leakage to remarkably low atomic leak rates for which this invention is dedicated. Said builder(s) may also enhance the silicone oil's ability to hold against high pressure. As disclosed herein, the built silicone oil has exhibited an inverse relationship between applied pressure and sealing performance. That is, as the pressure in a system is raised, one would expect to observe the leak rate increase; however, inversely, it has been discovered that as the pressure is increased, the leak rate would drop. This is an unexpected result that occurs when all the builders are present at properly aligned ratios, in some, but not all of the trial formulations as disclosed herein. In embodiments, the silicone oil may be present in a range from about 50% to about 90% of the composition.

One example of an optional building block would be a friction modifier. Addition of a friction modifier will aid in the ease of assembly and disassembly of the threaded parts. Silicone oil by itself has a low coefficient of friction and the addition of fine to ultra-fine PTFE powder or graphite or molybdenum disulfide may be useful but not vital to this disclosed composition. In embodiments, PTFE may be used as it is considered a food safe ingredient. The typical use level of PTFE may range from about 1% to about 50% by weight of the compound, including with a range of about 2% to about 20% by weight of the compound. PTFE may be Fine (F, i.e., particle sizes ranging from about 50 microns to about 250 microns) or Ultra-Fine (UF, i.e., particle sizes ranging from about 0.1 microns to about 50 microns).

Another example of an optional building block may be a viscosity booster in the form of, for example, fumed silica or organoclays which are typically used to help increase the viscosity of oils. Such an optional viscosity booster may be considered useful to control the overall consistency of the finished product. In this invention, fumed silica may be the selected viscosity booster since it again is considered food safe. The fumed silica may be used at a level of about 0.5% to about 10% by weight of the compound, including with a range of about 1% to about 8% by weight of the compound.

Another example of an optional building additive may be chosen from a long list of fillers and/or bulking agents. Typically, any fine to ultra-fine powder that is food safe, nonreactive to most liquids and gases, temperature tolerant and chemically stable may be used. Some inorganic examples used as fillers would include, but are not limited to, calcium carbonate, calcium sulfate and titanium dioxide or combinations thereof. Some organic examples of fillers would be fine to ultra-fine powdered plastics such as polyvinyl chloride (PVC), polyethylene or polypropylene or combinations thereof. These fillers may be present in concentrations of anywhere between about 1% to about 50% by weight of the compound, including with a range of about 10% to about 40% of the compound. However, care must be taken because adding too much filler will cause the viscoelastic effect to drop out and reduce the compound to a thixotrope or paste. To avoid this degradation, the percent of filler must be judicious. That is to say, the quantity of filler added should not exceed 30% to about 40% of total solids, inclusive of all other solid materials for the final formulation.

The following examples are intended to illustrate but not limit the invention.

EXAMPLES

Materials and Methods

Fine (F) shall represent particles sizes ranging from 50 to 250 microns.

Ultra-Fine (UF) shall represent particles sizes ranging from 0.1 to 50 microns.

Helium Leak Detection Equipment and Method:

A Leybold Helium Leak Detector model Phoenix L300i (Leybold USA, Inc., Glenwillow, OH) was calibrated to manufacturer's specifications. Testing was performed in a Bell Jar assembly. Thread sealant was applied in ample amounts onto the threads of ½ inch National Pipe Thread (NTP) galvanized pipe assembly. Fittings were torqued to about 70 in-lbs. With the fitting securely connected to the helium pressure line, the test sample was place inside the test chamber and evacuated. The test sample was pressurized to about 50 PSIG and the pressure increased by about 50 PSIG every 30 seconds for 15 minutes. Leak rates were observed and recorded.

Results (see Table 1).

TABLE 1

| Time (in minutes) | Pressure (PSIG of He) | Example #1 Leak Rate (atm cc/sec) | Example #2 Leak Rate (atm cc/sec) | Example #3 Leak Rate (atm cc/sec) | Example #4 Leak Rate (atm cc/sec) |
|---|---|---|---|---|---|
| 0:30 | 50 | $5.1 \times 10^{-9}$ | $2.2 \times 10^{-9}$ | $5.8 \times 10^{-6}$ | $8.6 \times 10^{-4}$ |
| 1:00 | 100 | $5.0 \times 10^{-9}$ | $2.1 \times 10^{-9}$ | $5.5 \times 10^{-6}$ | $8.6 \times 10^{-4}$ |
| 1:30 | 150 | $4.8 \times 10^{-9}$ | $2.0 \times 10^{-9}$ | $5.2 \times 10^{-6}$ | $8.5 \times 10^{-4}$ |
| 2:00 | 200 | $4.7 \times 10^{-9}$ | $1.9 \times 10^{-9}$ | $5.0 \times 10^{-6}$ | $8.6 \times 10^{-4}$ |
| 2:30 | 250 | $5.2 \times 10^{-9}$ | $1.8 \times 10^{-9}$ | $4.8 \times 10^{-6}$ | $9.4 \times 10^{-4}$ |
| 3:00 | 300 | $5.0 \times 10^{-8}$ | $1.7 \times 10^{-9}$ | $4.6 \times 10^{-6}$ | $9.9 \times 10^{-4}$ |
| 3:30 | 350 | $5.1 \times 10^{-9}$ | $1.7 \times 10^{-9}$ | $4.3 \times 10^{-6}$ | $1.2 \times 10^{-3}$ |
| 4:00 | 400 | $4.9 \times 10^{-9}$ | $1.6 \times 10^{-9}$ | $4.1 \times 10^{-6}$ | $1.2 \times 10^{-3}$ |
| 4:30 | 450 | $5.1 \times 10^{-9}$ | $1.5 \times 10^{-9}$ | $3.7 \times 10^{-6}$ | $1.0 \times 10^{-3}$ |
| 5:00 | 500 | $5.1 \times 10^{-9}$ | $1.4 \times 10^{-9}$ | $3.6 \times 10^{-6}$ | $7.2 \times 10^{-2}$ |
| 5:30 | 550 | $5.1 \times 10^{-9}$ | $1.4 \times 10^{-9}$ | $3.4 \times 10^{-6}$ | $6.0 \times 10^{-1}$ |
| 6:00 | 600 | $5.9 \times 10^{-9}$ | $1.3 \times 10^{-9}$ | $3.2 \times 10^{-6}$ | Failed |
| 6:30 | 650 | $6.5 \times 10^{-9}$ | $1.3 \times 10^{-9}$ | $3.1 \times 10^{-6}$ | |
| 7:00 | 700 | $7.7 \times 10^{-9}$ | $1.2 \times 10^{-9}$ | $2.9 \times 10^{-6}$ | |
| 7:30 | 750 | $7.7 \times 10^{-9}$ | $1.2 \times 10^{-9}$ | $2.7 \times 10^{-6}$ | |
| 8:00 | 800 | $9.0 \times 10^{-9}$ | $1.1 \times 10^{-9}$ | $2.6 \times 10^{-6}$ | |
| 8:30 | 850 | Failed | $1.1 \times 10^{-9}$ | $2.5 \times 10^{-6}$ | |
| 9:00 | 900 | | $1.1 \times 10^{-9}$ | $2.4 \times 10^{-6}$ | |
| 9:30 | 950 | | $1.0 \times 10^{-9}$ | $2.3 \times 10^{-6}$ | |
| 10:00 | 1000 | | $1.0 \times 10^{-9}$ | $2.2 \times 10^{-6}$ | |
| 10:30 | 1050 | | $9.6 \times 10^{-10}$ | $2.1 \times 10^{-6}$ | |
| 11:00 | 1100 | | $9.5 \times 10^{-10}$ | $2.0 \times 10^{-6}$ | |
| 11:30 | 1150 | | $9.2 \times 10^{-10}$ | $2.0 \times 10^{-6}$ | |
| 12:00 | 1200 | | $8.6 \times 10^{-10}$ | $1.8 \times 10^{-6}$ | |
| 12:30 | 1250 | | $8.4 \times 10^{-10}$ | $1.8 \times 10^{-6}$ | |
| 13:00 | 1300 | | $8.2 \times 10^{-10}$ | $1.7 \times 10^{-6}$ | |
| 13:30 | 1350 | | $8.0 \times 10^{-10}$ | $1.6 \times 10^{-6}$ | |
| 14:00 | 1400 | | $7.5 \times 10^{-10}$ | $1.5 \times 10^{-6}$ | |
| 14:30 | 1450 | | $7.5 \times 10^{-10}$ | $1.5 \times 10^{-6}$ | |
| 15:00 | 1500 | | $7.0 \times 10^{-10}$ | $1.5 \times 10^{-6}$ | |

Example #1. Viscoelastic liquid (see Table 2)

TABLE 2

| Silicone Oil | 85% |
|---|---|
| PTFE (UF) | 10% |
| Fumed Silica | 5% |

Viscosity of Example #1 is about 80000 cSt. Percentages are wt/wt.

At first glance, failure of the sealant is seen @ 850 PSIG. However, this is actually a better pressure holding capacity than most commercially available thread sealants (see Example #4). In fact, most of the non-curing thread sealants observed fail at about 350 PSIG with helium. Commercially available thread sealants that hard set or cure usually fail to reach 700 PSIG with some failing as low as 200 PSIG. For comparison commercial thread sealants have leak rates in the range of $10^{-3}$ to $10^{-4}$ before failing.

Example #2 Viscoelastic liquid (see Table 3).

TABLE 3

| Silicone Oil | 79% |
|---|---|
| PTFE (UF) | 8% |

TABLE 3-continued

| Fumed Silica | 3% |
| --- | --- |
| CaCO₃ | 10% |

Viscosity of Example #2 is about 90000 cSt. Percentages are wt/wt.

With the addition of CaCO₃ and reduction of PTFE and Fumed Silica, Example #2 reaches the pressure test limit of 1500 PSIG. The phenomena of inverse pressure to leak rate was observed in Example #2. As may be seen, the leak rate starts out in the $10^{-9}$ range then as the pressure increases, the leak rate slows another order of magnitude to the $10^{-10}$.

Example #3 Viscoelastic Liquid (see Table 4)

TABLE 4

| Silicone Oil | 84% |
| --- | --- |
| PTFE (UF) | 5% |
| Fumed Silica | 3% |
| CaCO₃ | 8% |

Viscosity of Example #3 is about 65000 cSt. Percentages are wt/wt.

Reducing the total solids to just 16% results in higher measured leak rates. The inverse pressure to leak rate is still observed.

Example #4 Paste

Is formulated following Example #2 from U.S. Pat. No. 4,548,960 (see Table 5).

TABLE 5

| Talc | 45 |
| --- | --- |
| TiO₂ | 3 |
| Castor Oil | 40 |
| Teflon Fibers | 12 |

Viscosity of Example #4 is about 95000 cSt. Higher initial leak rates with this product versus the present compositions were observed. The leak rate is linear with leakage increasing as more pressure is applied before finally failing.

Although the invention has been described with reference to the above examples, it will be understood that modifications and variations are encompassed within the spirit and scope of the invention. Accordingly, the invention is limited only by the following claims.

We claim herein:

1. A viscoelastic non-curing liquid sealing composition comprising silicone oil, and a building block, wherein the building block comprises a fine to ultra-fine polytetrafluoroethylene (PTFE) fumed silica and fine to ultra-fine inorganic powders of calcium carbonate, wherein silicone oil is present at 50% to about 90% wt/wt of the composition, the PTFE is present in the range of about 2% to about 20% PTFE wt/wt of the composition, the fumed silica is present in the range of about 0.5% to about 10% wt/wt of the composition, and the fine to ultra-fine inorganic powders of calcium carbonate are present in the range of about 8% to about 10% wt/wt of the composition, and wherein said composition exhibits a viscosity in the range of about $2 \times 10^4$ cSt to about $5 \times 10^5$ cSt at 25° C., and wherein said composition exhibits an inverse pressure to leak rate phenomena.

2. The viscoelastic non-curing liquid sealing composition of claim 1, wherein the inverse pressure leak rate phenomenon is determined by helium leak detection, and wherein when the leak rate starts out in the range of about $10^{-9}$ atm cc/sec then, as the pressure increases, the leak rate slows to an order of magnitude of about $10^{-10}$ atm cc/sec.

3. The viscoelastic non-curing liquid sealing composition of claim 1, wherein the silicone oil is present in the range of about 79% to about 85% wt/wt of the composition.

4. The viscoelastic non-curing liquid sealing composition of claim 1, wherein the PTFE is ultra-fine.

5. The viscoelastic non-curing liquid sealing composition of claim 4, wherein the PTFE is present in the range of about 5% to about 10% PTFE wt/wt of the composition.

6. The viscoelastic non-curing liquid sealing composition of claim 1, wherein the fumed silica is present between about 3% to 5% wt/wt of the composition.

7. The viscoelastic non-curing liquid sealing composition of claim 6, wherein the fumed silica is present at about 3% wt/wt of the composition.

8. The viscoelastic non-curing liquid sealing composition of claim 1, wherein the calcium carbonate is a fine powder.

9. The viscoelastic non-curing liquid sealing composition of claim 1, wherein silicone oil is present at about 90% wt/wt of the composition, the PTFE is present at about 7% wt/wt of the composition, the fumed silica is present at about 4% wt/wt of the composition, and the fine to ultra-fine inorganic powders of calcium carbonate are present at about 8% wt/wt of the composition.

10. A viscoelastic liquid non-cure sealing composition comprising silicone oil, fine to ultra-fine polytetrafluoroethylene (PTFE), and fine to ultra-fine inorganic powders of calcium carbonate fumed silica, wherein silicone oil is present at 50% to about 90% wt/wt of the composition, the PTFE is present in the range of about 2% to about 20% PTFE wt/wt of the composition, the fumed silica is present in the range of about 0.5% to about 10% wt/wt of the composition and the fine to ultra-fine inorganic powders of calcium carbonate are present in the range of about 8% to no more than about 10% wt/wt of the composition, wherein said composition exhibits an inverse pressure to leak rate phenomena, wherein the inverse pressure leak rate phenomenon is determined by helium leak detection, and wherein when the leak rate starts out in the range of about $10^{-9}$ atm cc/sec then, as the pressure increases, the leak rate slows to an order of magnitude of about $10^{-10}$ atm cc/sec.

11. The viscoelastic liquid non-cure sealing composition of claim 10, wherein said composition exhibits a viscosity in the range of about $6.4 \times 10^4$ cSt to about $9.9 \times 10^4$ cSt at 25° C.

12. The viscoelastic liquid non-cure sealing composition of claim 10, wherein the silicone oil is present in the range of about 79% to about 85% wt/wt of the composition.

13. The viscoelastic liquid non-cure sealing composition of claim 10, wherein the PTFE is present in the range of about 5% to about 10% wt/wt of the composition.

14. The viscoelastic liquid non-cure sealing composition of claim 10, wherein the fumed silica is present at about 3% wt/wt of the composition.

15. A method of sealing threaded piping and/or plumbing fitting comprising:
   a) applying the viscoelastic liquid sealing composition of claim 1 to male and/or female threads contained in said piping or plumbing fitting; and
   b) connecting said composition applied threaded piping and/or plumbing fitting to a separate threaded piping and/or plumbing fitting,
   wherein said composition exhibits an inverse pressure to leak rate phenomena.

16. The method of claim 15, wherein the inverse pressure leak rate phenomenon is determined by helium leak detection, wherein when the leak rate starts out in the range of about $10^{-9}$ atm cc/sec then, as the pressure increases, the leak rate slows to an order of magnitude of about $10^{-10}$ atm cc/sec.

17. The method of claim 15, wherein the silicone oil is present at about 90% wt/wt of the composition, the PTFE is present in the range of about 5% to about 10% PTFE wt/wt of the composition, and the fine to ultra-fine inorganic powders of calcium carbonate is present in about 8%.

18. The method of claim 16, wherein the threaded piping and or plumbing fitting is selected from the group consisting of adaptors, elbows, couplings, unions, nipples, reducers, double-tapped bushings, tees, double-tees, crosses, caps, plugs, barbs, valves, compression fittings, flair fittings, flange fittings and combinations thereof.

* * * * *